United States Patent [19]
Miller

[11] Patent Number: 4,550,046
[45] Date of Patent: Oct. 29, 1985

[54] INSULATING MATERIAL

[76] Inventor: Stephen D. Miller, 2748 Via Anita, Palos Verdes Estates, Calif. 90274

[21] Appl. No.: 638,427

[22] Filed: Aug. 7, 1984

Related U.S. Application Data

[63] Continuation-in-part of Ser. No. 504,600, Jun. 20, 1983, abandoned, which is a continuation of Ser. No. 360,402, Mar. 22, 1982, abandoned.

[51] Int. Cl.[4] .............................................. B32B 3/12
[52] U.S. Cl. ................................... 428/116; 428/119; 428/137; 428/920
[58] Field of Search ............... 428/116, 118, 119, 120, 428/131, 134, 135, 136, 137, 138, 155, 178, 247, 255, 920

[56] References Cited

U.S. PATENT DOCUMENTS

| | | | |
|---|---|---|---|
| 3,405,027 | 10/1968 | Wyckoff | 428/255 |
| 3,454,455 | 7/1969 | Rasmussen | 428/136 |
| 3,649,430 | 3/1972 | Lewis et al. | 428/134 |
| 3,707,433 | 12/1972 | Clough et al. | 428/137 |
| 3,839,525 | 10/1974 | Doll | 428/135 |
| 3,968,287 | 7/1976 | Balk | 428/910 |
| 4,055,613 | 10/1977 | Kapral | 428/159 |
| 4,105,724 | 8/1978 | Talbot | 428/116 |
| 4,136,222 | 1/1979 | Jonnes | 2/243 R |
| 4,206,258 | 6/1980 | Balcar | 428/131 |
| 4,331,725 | 5/1982 | Akao | 428/138 |

FOREIGN PATENT DOCUMENTS 600271  3/1978  U.S.S.R. .............................. 428/137

OTHER PUBLICATIONS

Transactions of ASME, Journal of Heat Transfer, "Natural Convection in Enclosed Spaces-Review Application to Solar Energy Collection", (May 1976), pp. 182-188.

Primary Examiner—William J. Van Balen
Attorney, Agent, or Firm—I. Shuldiner

[57] ABSTRACT

A composite insulating material which is comprised of one or more layers of open ended cells formed from flexible thin plastic sheet, and may be fastened to one or more cover sheets. The material is flexible enough to be worn as clothing and derives its insulating properties by reducing thermal conducting paths and areas, by introducing numerous controlled geometry air cells between the heat source and inner layer to further lower conductivity and inhibit convection currents and, by absorbing radiant thermal energy within the cell walls thereby reducing heat transmission by radiation. Metallized reflecting layers are not required to achieve high insulating efficiency.

11 Claims, 7 Drawing Figures

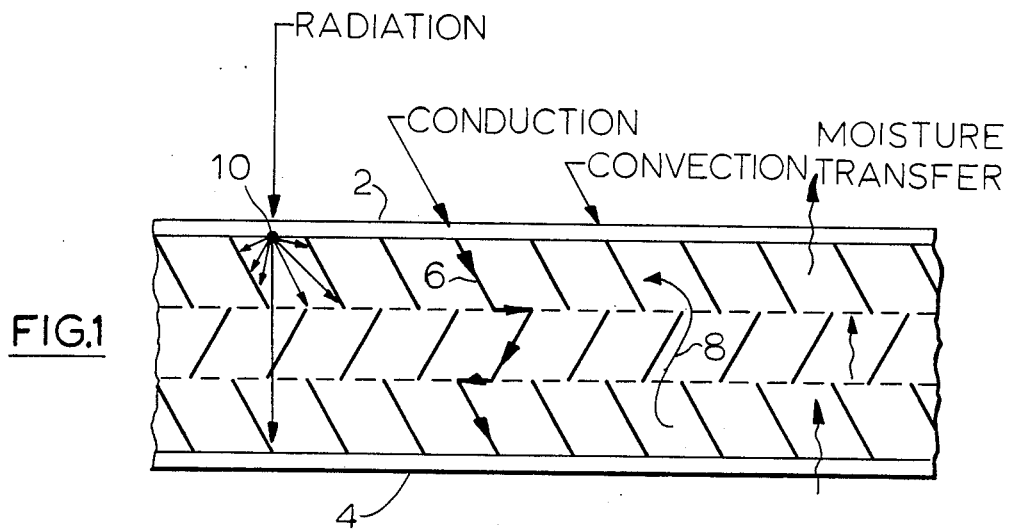
FIG.1
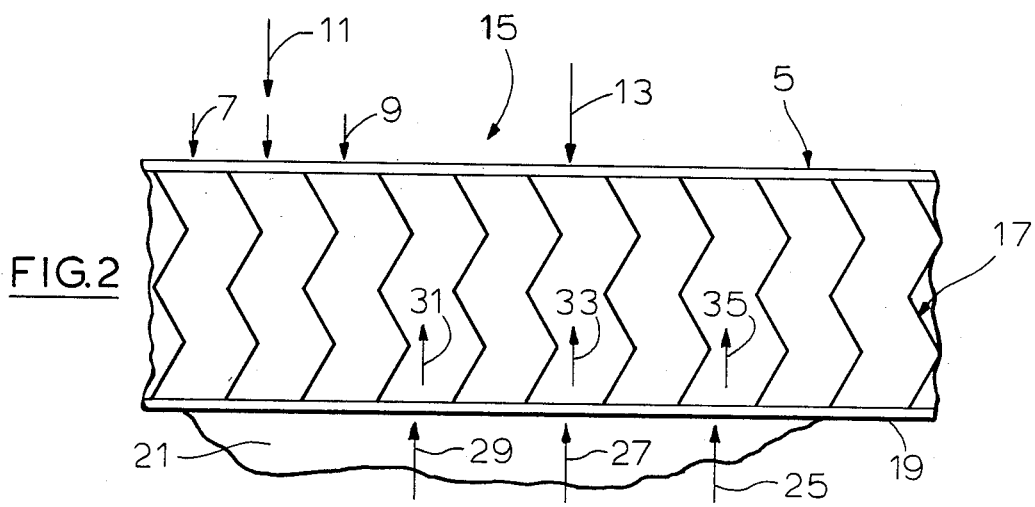
FIG.2
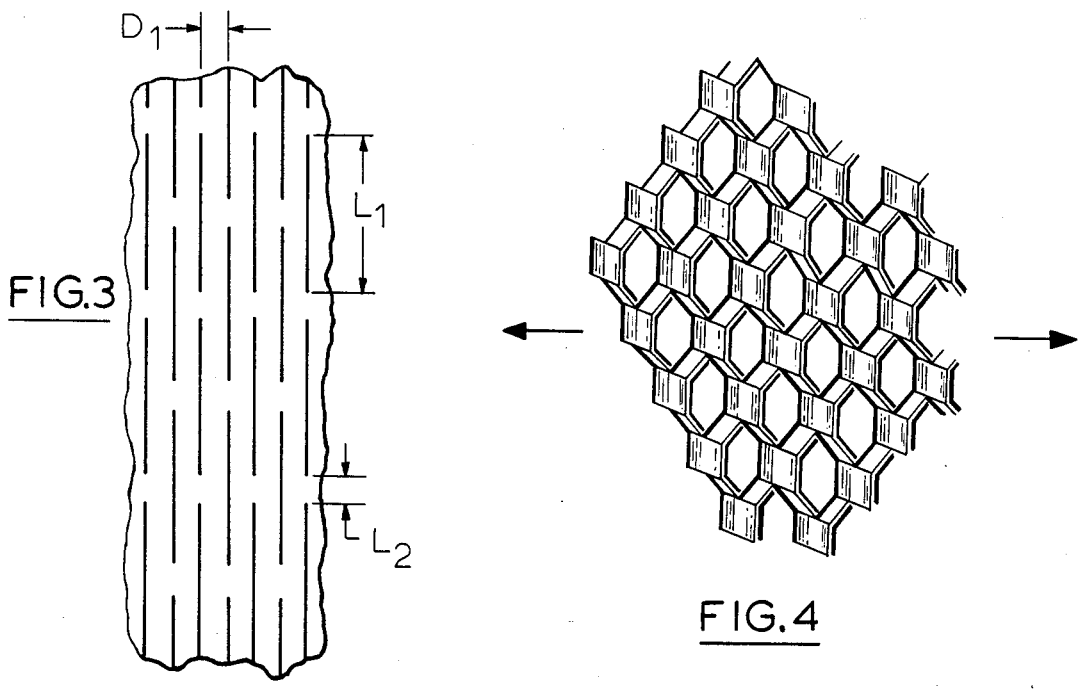
FIG.3
FIG.4

INSULATING MATERIAL

BACKGROUND OF THE INVENTION

This is a continuation in part of application Ser. No. 504,600 filed 6-20-83 now abandoned which is a continuation of application Ser. No. 360,402 filed Mar. 22, 1982 now abandoned.

There are three basic methods by which heat is transferred from a region of high temperature to a region of lower temperature.

1. Conduction. All materials transmit heat through a given thickness of material at a rate which is dependant on its thermal conductivity. This is generally expressed by the following relationship:

$$k = BTU/(hour)(ft^2)/(°F./ft) = BTU/(hour)(ft)(°F.)$$

where:
k = thermal conductivity
BTU = heat transmitted in British Thermal Units
hour = standard time period
°F. = temperature difference, degrees Fahrenheit
ft = length, feet
$ft^2$ = area, square feet The values of thermal conductivity are inherent with the material and differ widely. For example copper, which is an excellent conductor has a value of k=220 whereas, k=0.025 for corkboard, an insulator. Obviously, when one chooses materials for fabrication of thermal protective clothing and items such as sleeping bags and active wear he will try to select material with low thermal conductivity.

For any given material, the thermal conductivity is rated at heat rate/area/length/temperature difference. Therefore, a very powerful method of decreasing heat transfer becomes available to the inventor if he reduces the effective area of conducting material available for the heat to flow through. The inventor uses this approach in this invention by having thin cross sections of low thermal conductivity materials between the inner and outer surfaces.

Another method of decreasing heat flow through a given material is to simply increase the thickness or length of the heat conduction path. This method was also used by the inventor, by causing the conduction path to be extremely long compared to the area available. This is done by utilizing thin plastic sheets so that heat has to flow edgewise through several thicknesses thereby providing very high ratios of length to area of heat flow and resultant high thermal resistance. Also, the effective conduction length is substantially greater than the overall material thickness dimension. This is illustrated schematically in FIG. 1, wherein the conduction heat path length is shown along the arrows. Thus the effective thickness of the material for heat transfer is much greater than the thickness between the cover sheets.

2. Convection. Heat is transferred from one point to another within a fluid (air), driven by a temperature difference, by the mixing of one portion of the fluid with another. In natural convection the motion of the fluid is entirely the result of differences of density resulting from the temperature differences. If motion is produced by mechanical means such as a fan, or by wind, the resultant mechanism of gaseous heat transfer is called forced convection. Convective heat transfer is greatly reduced by confining the air spaces between the hot and cold surfaces into tiny cells which inhibit the thermally induced flow of air and reduce or prevent convective motion. When the ratio of cell height to cell width is great enough, the boundary layer and skin friction drag damp out most of the convection heat induced motion and internal convection becomes negligible. This is well known in the art and that is why insulating foams use such small cells. This invention makes use of the cell size inhibition of convective flow by limiting the absolute size and relative dimensions of the cells formed in this material. A total cell height to cell width ratio ranging from 4 to 20 and more is effective for this purpose. Also utilizing multiple layers to achieve the desired cell height to width ratio increases the viscous friction on air flow between the layers. Open cells over porous linings are used to allow perspiration and moisture to penetrate from the inner lining to the ambient outer atmosphere, thus this material is said to "breathe".

3. Radiation. A hot body gives off heat in the form of radiant energy which is emitted in all directions. When this radiant energy strikes another body, part may be reflected, part may be transmitted through the body and the remainder is absorbed and transformed into heat. Radiant energy is transferred from a warm body to a cooler one according to the relationship:

$$w = k_1 k_2 (T_1^4 - T_2^4)$$

Where:
W = energy transmitted by radiation, $BTU/(hr)(ft^2)$
$k_1$ = Stefan-Boltzman constant, $BTU/(hr)/(ft^2)/(°F.)^4$
$k_2$ = emissiviy factor, (a function of the surfaces of both bodies), dimensionless
$T_1$ = radiating surface temperature, (hot body), °F.
$T_2$ = absorbing surface temperature, (cold body), °F.

Wherein the emissivity factor is a function of the surface characteristics of the materials, for example, a highly reflective material such as gold has an emissivity of 0.01, whereas a good absorber (and emitter) such as black paint has an emissivity of 0.95.

Radiant energy transmission from surface 1 to surface 2 may be controlled by 2 methods:

(1) Low emissivity (highly reflective) surfaces limit the thermal energy leaving the warm surface, and/or reflect thermal energy from the colder surface, and limit its absorbtion. This reflecting principle is utilized by the familiar radiation shield type of thermal insulation.

(2) High emissivity surfaces, which are also highly absorbing, can be coupled with a particular geometry so that thermal energy leaving a warm surface is intercepted and absorbed by the insulating medium and thus cannot directly reach the cold surface. This method is utilized by this invention in that an absorbing material is used to form the insulating cellular structure. Highly reflective surfaces on plastic films are generally achieved by use of a metallic coating which is relatively expensive, and prone to degrade and flake off with time, handling, and washing, to which it would normally be subjected to in articles such as clothing. The absorbing characteristics of the materials recommended in this invention do not substantially change with normal treatment over time and thus are thermally more stable, thereby providing longer useful article life.

ENVIRONMENTAL DESIGN

In the design of an insulating material, one has to consider the end use of the material, the thermal environment on the outside of the material and the thermal requirements for the protected or inner side of the material. Some of the parameters to be considered in selecting the most suitable materials and critical design dimensions for applying the disclosed insulation include:

Outside temperature range
Exposure to sun
Wind
Humidity
Perspiration rate of body
Precipitation
Direct contact with solid surfaces For example, continuous exposure to moisture would preclude the use of materials such as urethane foam where one does not want to absorb water.

MECHANICAL DESIGN

This invention considers the requirement that the insulating material can be worn comfortably by a human being.

In reviewing the design of insulating materials as described above, the inventor has greatly simplified the construction of his insulating material and has improved the thermal resistance for comparable weight. For example, typical polyester fiber battings have a working density of 0.40 to 0.50 lb./cu. ft and down or feathers about 0.25 to 0.30 lb./cu. ft, while the disclosed preferred material working density is about 0.28 lb./cu. ft. The inventor has improved the flexibility and "wearability" of his design with a low cost implementation as compared to those disclosed in the references described below and on the market. He has also shown that it is not necessary to have metallic radiation reflectors as a part of his construction. The inventor has also been able to increase the vapor permeability by about an order of magnitude with his design so as to allow a person wearing insulating clothing made from his invention to be more comfortable because perspiration can readily pass through the insulating material.

DESCRIPTION OF THE PRIOR ART

In previous practice, insulating materials designed to retard heat flow into and/or out of a system have been specified by the environmental conditions to which the system is exposed, to the particular mode of thermal energy transfer to be retarded and by special requirements such as flexibility, strength, weight, cost, etc. Inexpensive cellular and fibrous materials primarily reduce heat transfer by reduction of conducting area per unit cross section, by limiting convection between the hot and cold surfaces and by scattering some of the radiant energy. Honeycomb like materials with small thin cellular structures are superior insulators because they can be made with smaller heat conducting cross sectional areas, their cells can be sized to restrict convection to a greater degree than bulk insulators and foams by limiting the onset of convection to a predesigned threshold value, also radiant energy can be reduced by being trapped within the cell walls.

Since their introduction around the turn of the century, honeycomb materials have been highly developed technically but their relatively high manufacturing cost, difficulty in application and processing, and structural rigidity have limited their use primarily to aircraft and military structural applications where rigidity and structural efficiency are more important than cost. Their use as thermal insulation has been limited by high manufacturing costs and undeveloped manufacturing technology. In addition, honeycomb insulation has not been used in clothing because of poor compression recovery, low flexibility and generally poor techniques of garment construction. The technology of this invention offers a unique solution to all the above problems.

Jonnes in U.S. Pat. No. 4,136,222 shows a honeycomb sandwich comprising a honeycomb core formed from polymeric foam cemented between two sheets, at least one of which has a vapor deposited layer of specularly reflective material. He says that his honeycomb layer is between 0.25 to 1.5 centimeters thick and each cell has a maximum span of 5 centimeters. The foam honeycomb covers or connects with between 10 to 60 percent of the cover sheets area or preferably 20 to 40 percent. It is apparent that this design will inhibit transfer of perspiration from the inside to the outside of the clothing. If the deposited metallic layers are to be effective, their surface can not be very open to the passage of moisture at atmospheric pressure. Minute fractures in the reflective layers can reduce the reflectivity as each fracture acts as a perfect black body. On the other hand, the invention described in this application has a porosity of at least 95% which will allow the free passage of water vapor. Impervious metallic radiation reflectors are unnecessary to the effective operation of the invention described in this application because the radiation is absorbed by the cell walls and not transmitted directly to the cold surface. Another problem with Jonnes' invention is that although the inner and outer layers may be flexible, and granted that the polymeric foam is flexible, when the three parts are assembled together, the moment of inertia in bending increases by an enormous amount. The assembled invention will be stiff and undrapable as compared to the invention disclosed in this application. In fact, a section of such honeycomb cloth will be self supporting and it is well known that one property of honeycomb construction is its extreme resistance to the formation of compound curves. Jonnes relies on the shearing and squeezing of his foam honeycomb cells for flexibility because his cover sheets will resist tensile deflection and shear. In contrast, the cell walls of this invention, not being normal to the cover sheets, will exhibit greater compression recovery. Also, if moisture does penetrate into the interior of the foam cells, it will tend to be absorbed and retained thereby increasing the weight of the cloth with time. If the moisture condenses, it will be retained until it evaporates or is forced out of the cells by squeezing or wringing. Also, freezing of entrapped moisture can crack the separating layers thereby increasing the structural and thermal degradation rates. In contrast the disclosed material would not retain more than 0.01% water by weight due to the low affinity of these non porous plastic film materials to moisture.

Balk, In U.S. Pat. No. 3,968,287 describes a method of making a composite laminate comprising two synthetic-resin foils having mutually transverse main stretch directions which is formed by bonding the foils together after they have been incised in rows of spaced apart incisions extending in the main stretch direction of each foil. The invention described in this application can use a similar process to provide the insulating cells of the disclosed invention but does not claim the process of forming the insulating cells. The inventor merely describes the process in accordance with his duty to disclose the best technique for forming the cells. In these applications, it is unimportant as to how the cells are formed, and they may be formed from single or multiple layers of plastic sheet. Alternatively, they can be formed by molding, by rolling through rotating dies, by extrusion or by any means known to those with ordinary skill in the art of fabricating such cells.

Crane, in U.S. Pat. No. 3,245,606, describes a packaging bag of slit transparent plastic film wherein about half the film area is unslit to provide for package strength and shape. The purpose of the slit portion is to provide package expandability and ventilation for the contained goods such as a bunch of grapes. The concept of using a slit pattern for expanding thin plastic sheet is similar to that of this invention. However, the necessary use of specific slit pattern, extent of stretch, material thickness and radiation absorption properties are among the factors that render Crane's packaging material unsuitable for use as an insulation.

Wyckoff, in U.S. Pat. No. 3,405,027 describes the manufacture of composite films wherein a system of webs and ribs imparts the desired strength characteristics to the laminated structure. The invention described herein can use a similar method for producing the insulating cells however it is not the preferred method of manufacture.

Clough, in U.S. Pat. No. 3,707,433 describes an insulating material comprising two layers of plastic film sandwiched around a reinforcement of fibers with one or both of the inner surfaces of the plastic sheets coated with a reflective metal layer. A limited amount of vapor permeability is provided by a system of transverse fibers and holes. Alternatively, he uses a foam separator and a sandwich construction which has all of the disadvantages described above for the Jonnes invention. The main method of restricting heat transmission utilizes the radiant reflective properties of metallized films. Although individual layers are thin, the required adhesive bonding within each layer, will restrict drapability, and in a multi-layer use will cause the item to be stiff, especially as compared to the flexibility inherent in this invention.

Lewis, et al. in U.S. Pat. No. 3,649,430 describes metal laminates with polymeric cores used to provide sound and vibration damping characteristics to structural materials. Here the polymeric core material is bonded to the metal foil outer layers. These cores are selected to help provide rigidity to the structure. Such materials, while perhaps suited to structural insulation uses are wholly inapplicable to clothing or similar uses where flexibility is required.

Akao in U.S. Pat. No. 4,331,725 describes a laminated wraping material comprising at least two uniaxially-stretched sheets of plastic film adhesively bonded to provide desired strength properties. The adhesive layer may be perforated in the form of a net. Use of such a material as an insulation material for clothing, or other articles that need to "breathe" or inhibit heat transmission would not be suitable due to the inherent limitations of the film, such as moisture impermeability, thickness and stiffness.

Doll in U.S. Pat. No. 3,839,525 describes a method for producing a net-like material by slitting a plastic film and stretching and heating sufficiently to provide a rounded cross section to the material elements. The method of slitting and stretching a plastic film is well known and is disclosed in this invention to indicate the preferred method of forming cellular material. The netting material of Doll would not provide adequate thermal conductive resistance as the cross sectional area per unit length is large as compared to the slit and stretched material of this invention that has not been heated to nearly the extent disclosed by Doll.

Rasmussen in U.S. Pat. No. 3,454,455 discloses a laminate wherein polymeric films having mutually transverse stretch directions are slit in a row pattern to provide a reticular structure with increased tear resistance. This material is similar to that described by Balk, above and its use and limitations relative to the present invention would be similar.

SUMMARY OF THE PRESENT INVENTION

This invention is a design for a composite insulating fabric which reduces and controls heat transfer and provides for free moisture transfer from the interior protected surface to the outer ambient surface. The invention accomplishes this by the combination of substantially non-planar or three dimensional layers of fabric formed into regular and predictable patterns of contiguous honeycomb like cells which are formed with offset walls between each layer, with a continuous, porous inner layer of fabric fastened to selected edges of the adjacent cellular layer. Each adjacent and offset cellular layer may be attached to the next cellular layer at selected points of the cellular structure. This selected and sparse system of attachment is very important because it greatly reduces heat transfer by conduction across the layers and reduces the structural rigidity of the "honeycomb" like structure. The ability of this material to stretch and shift makes garments possible which are close fitting, warm and comfortable. The cell walls being inclined give the cellular layers excellent compression recovery. Many applications will not require anything other than edge attachment or stabilization. If desired, an outer layer of flexible material may be loosely attached to the outer layer of cells to form a sandwich with little resistance to shear forces caused by deflection or crushing. The outer and inner cover sheets can be selected with characteristics determined by the user such as permeability, wearability, suitability for decoration, etc. The invention is inexpensive to fabricate, very flexible, has low bulk density and has excellent insulating properties while allowing free passage of water vapor from the inner surface to the outer surface. The insulating material will be very useful in the fabrication of lightweight outdoor equipment used in mountaineering, skiing, camping and hiking, such as sleeping bags, blankets, outdoor clothing and tents.

It should be noted however, that use of reflective surfaces on the cellular material and/or the cover sheets can be used if desired to further enhance overall thermal performance of the insulation. This use can increase cost, weight, degradation rate, and reduce breathability.

Presently available insulating materials on the market are bulky and expensive, such as down filled double walled clothing, blankets and sleeping bags of heavier synthetic substitutes for down, such as polyester fibers. Most of the sandwich materials mentioned in the description of prior art section of this application have not appeared in the commercial market due to high cost, poor comfort characteristics or other reasons cited above.

BRIEF DESCRIPTION OF THE DRAWINGS

FIG. 1 is a schematic cross section of the invention which illustrates the energy transmission paths between the two sides of the insulating material.

FIG. 2 is a schematic cross section illustrating energy transmission and an alternate aligned layer construction.

FIG. 3 is a top view of a typical slit pattern in a sheet of material prior to formation of cells by stretch forming.

FIG. 4 is a perspective view of the sheet illustrated in FIG. 11 after stretch forming.

DETAILED DESCRIPTION OF THE INVENTION

Figure 5:
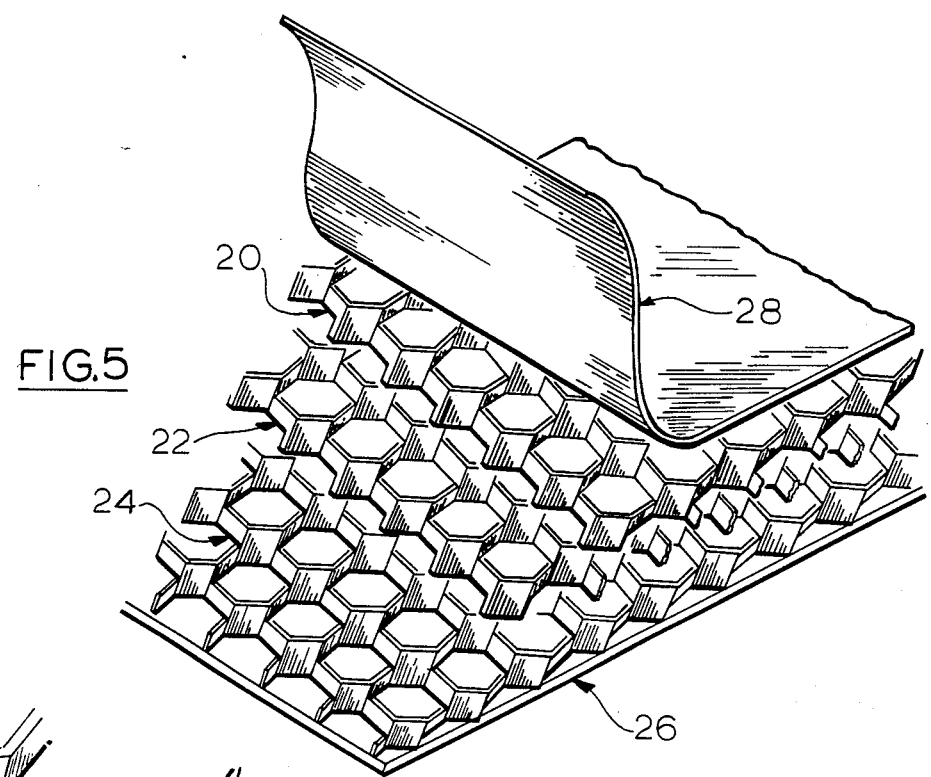
FIG. 5 is a perspective view of the cell pattern illustrating cell dimensions.

FIG. 1 schematically illustrates a random oriented three cell layer thick construction of the invention illustrating the energy transmission paths between the inner cover sheet 2 and the outer cover sheet 4. Energy transfer by conduction takes a long tortuous path through each cell wall layer as shown by the arrows 6. The transfer length comprises the summation of the individual lengths of the cell walls plus the thickness of the cover sheets. Also, the thermal resistance of each of the contact points between layers is very high relative to an equivalent thickness of solid material-thus the overall conduction thermal length to area ratio is very high for the total material thickness. Convection transmission would normally take place by air currents set up with the cells as shown by arrow 8, however these currents are limited in this invention with a proper cell size configuration, where boundary layer and skin friction drag damp out this motion. Radiant energy diffuse scattering is illustrated at a single point 10 from one of the outer layers. At each location where a radiation emission arrow intercepts a solid cell boundary, that energy will be absorbed and not transmitted to the other layer.

Referring now in detail to FIG. 2, there is illustrated a non-random or aligned orientation of a three cell layer construction and schematic cross section of the invention. On one side, the insulating material outer surface 5 is exposed to thermal radiation 7, convection heat transfer 9 from the wind 11, and conduction heat transfer 13 from a contacting surface 15. On the other side of the insulating cellular material 17 is a layer of porous fabric 19 which is in close proximity to a human being 21, or some object requiring thermal insulation. This porous fabric is exposed to liquid moisture 25, humidity 27, air currents 29, and contact with a human being or object. Heat in the forms of thermal radiation 31, conduction 33, and convection 35 are transferred across this porous fabric layer. The direction of the net heat transfer depends on the temperature difference across the wall with heat always going towards the direction of lower temperature.

The heat transferred externally by convection is absorbed by the outermost layer of material 5 and then is transferred across cell walls 17 by long discontinuous paths to the inner cloth layer 19 and then to the inner protected region. Heat transfer by conduction between the inner and outer surfaces has been greatly reduced by this long path and is nearly equivalent to that of gaseous conduction through the entrapped air. Internal convective heat transfer is limited by the appropriate design and selection of cell height to width ratios. The cell height to width ratio should exceed 4 and is practical up to at least 20 or 30. Testing of a sample of this material has indicated an effective thermal conductivity of 0.036 BTU/hr ft°F. measured between temperatures of 96° F. and −7°, this material had a cell height to width ratio of 9.3. The contribution to be expected from solid and gaseous conduction represents about one third of the total heat transferred, the remainder is that due to radiation plus convection. Radiation absorption by the cell walls and convection suppression by cell size and configuration is very effective because the combined radiation plus convection transfer mechanisms, which would be difficult to separately estimate, represents only about one fourth of the theoretical black body radiation interchange between the two boundary temperatures.

Figure 6:
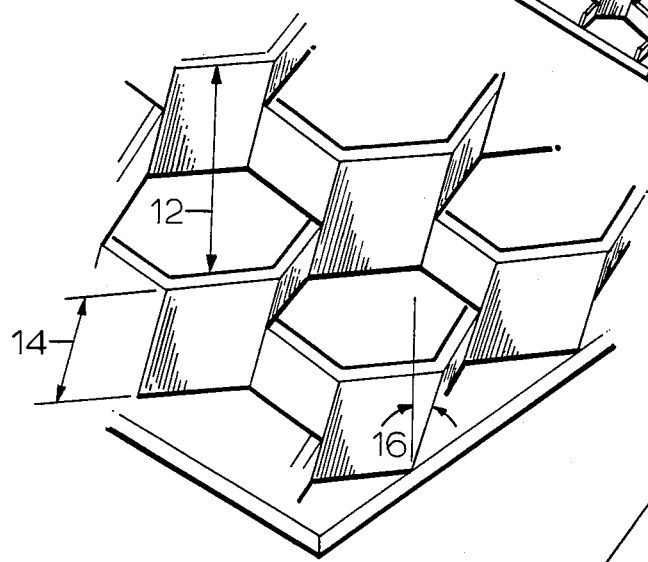
FIG. 6 is a cross section of the invention showing a three layer embodiment.

The cell walls are inclined to the plane of the cover sheets to enhance the flexibility and compression recovery of this construction. The angle which the cell walls make with the normal to the cover sheets 16 is shown in FIG. 6 should exceed 10°, up to about 60°, for most applications. Cell dimensions of width 12 and height 14 are also identified in FIG. 6.

Moisture passes across the porous inner and outer layers, and through the open cells to the outer atmosphere. Moisture is not absorbed by the cell walls to any degree because they are "impervious" to water and the materials shed moisture (hydrophobic).

There are many possible methods for producing the cellular material desired, three of which include:

(1) Starting from solid planar sheets of a plastic material such as polyolefin and making a regular pattern of slits, as shown in FIG. 3, and then either by stretching in a direction normal to the slits, and/or applying heat to produce the desired cell configuration, shown in FIG. 4 this stage is determined by the slit pattern and the amount of stretch or heat applied.

(2) Applying localized pressure differences in a mold or form to the planar unslit plastic sheet causing permanent deformation of the material in a cellular pattern.

(3) Causing a liquified plastic material to be cast into a mold and allowed to solidify thereby assuming the desired shape and cellular pattern.

DESCRIPTION OF THE PREFERRED EMBODIMENTS

In one specific embodiment of this invention the material is configured for use as thermal insulation in an article of clothing outer wear such as a ski parka. This application uses a construction of twelve layers, made from slit and expanded sheets. (a simplified configuration of three layers 20, 22, 24 disposed between cover sheets 26, 28 is shown in FIG. 5).

Each layer of cells is manufactured from a planar sheet of a polymeric film, such as high density polyethylene, that can be between 0.0003 and 0.020 inches in thickness, preferably about 0.0006 inch, and maintains flexibility over the desired application temperature range of −60° F. to 130° F. The material should be absorptive to infra red radiation of 9 to 12 microns wavelength, which is the band of thermal radiation wavelengths, by having its surface treated or preferably by being opaque black. The slit pattern can be arranged to yield after stretching cell dimensions of between 0.025 to 0.75 inch wide and 0.010 to 0.5 inch high, the specific dimensions depending upon the particular application. The preferred slit pattern illustrated in FIG. 3, utilized a slit length, L1, of 0.1875 inch, an unslit spacing, L2, of 0.0625 inch and a row spacing, D1, of 0.050 inch. Expanding the slit material 100% in a direction normal to the slit and heat stabilizing while stretched, creates the desired honeycomb like cellular pattern. Each of these layers will have a cell wall height of 0.0918 inch a cell width of 0.118 inch and a layer height of 0.0795 inch due to the 60 degree angle between the cell walls and the nominal film plane. The assembly of 12 layers has an overall cell height to width ratio of 9.3, which is the critical parameter.

The desired configuration may be achieved by outer edge stabilizing the necessary number of layers and using conventional techniques such as heat sealing, bonding, stitching or stapling. Additional layers of metallized film may be used to enhance radiation energy inhibition and act as a mass transfer or vapor barrier between conventional fabric elements, when the limitations introduced by metallized films discussed above, primarily permeability and coating degradation, may be acceptable for a particular application. These metallized films can be incorporated as either part of the outer layers or as any part of the sandwich construction. Vapor permeability may be controlled by perforating the otherwise solid sheet forming the radiation/vapor barrier.

Another embodiment of this invention permits the thermal insulating effects to be varied by the garment wearer. This is accomplished by taking advantage of the natural elasticity of the sheet material and using a thicker film material for added strength and durability, such as opaque black 0.010 inch nylon, slit into the same pattern described above and stretched about 10% and heatset. This slight stretching will always keep the cells open to permit moisture transfer and help prevent the surface tension forces, due to any entrapped moisture, from causing adjacent flattened layers to adhere. Thus the cell walls will be inclined at large angles, nearly 90 degrees, to the normal of the film plane.

Used in cold weather clothing, an assembly of twenty layers are "tack" bonded at the edges to provide stabilization without unnecessary seam bulk. This assembly is less than 0.25 inch thick but may be stretched to twice its original length resulting in a 20% decrease in width and increase in thickness or loft to about 2 inches, and resulting in a greatly increased insulation effectiveness.

Specifically, such a garment might have loose fitting short sleeves and cover the upper torso, therefore providing limited thermal insulation effectiveness. When desired by the wearer, the sleeves would be drawn toward the wrists and the torso material drawn down toward the waist resulting in a much greater degree of insulating effectiveness. Thus this embodiment can provide comfort over a wide range of environmental conditions by enabling the wearer to adjust the amount of insulation provided.

Figure 7:
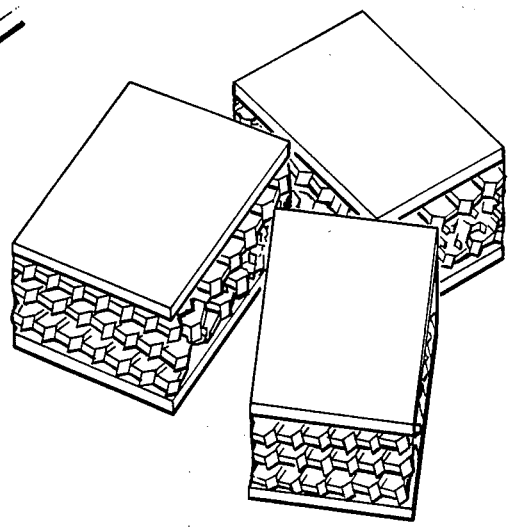
FIG. 7 is a view of elements of an alternate embodiment of the invention.

A third embodiment of this invention permits use of this material in applications where a blown fill is desired. Heat stabilized layer assemblies (made by any of above the described methods) may be cut, chopped or otherwise formed into small segments and used in a manner similar to that of ordinary blown fill insulations such as feathers, down or fibers. Heat stabilization is the preferred method enabling the slit and stretched layers to maintain shape upon cutting. FIG. 7 shows how 3 such segments may be in a random arrangement. Thus all of the advantages of this invention, with non-optimimum thermal performance, can be utilized without the need for changing end article production equipment and processes.

Summarizing the advantages of this invention:

(1) Thermal efficiency—an effective overall thermal conductivity of less than three times that of air. This is accomplished without the use of reflective layers.

(2) Light Weight—an overall working density range of about 0.2 to 3.0 pounds/cubic foot.

(3) Flexibility—an extremely flexible material able to fit human contours without stiffness.

(4) Low cost—material can be made in large quantities from readily available low cost polymeric materials.

(5) Moisture permeability—the open cell structure and hydrophobic nature of the film results in an insulation that will "breathe", permitting moisture (which can break down insulation materials and increase their weight) to pass through and not be absorbed or retained by the cell walls.

(6) Simplicity—multilayer assemblies can be readily assembled and generally requires only outer edge stabilization by conventional techniques to retain its shape.

(7) Durability—the types of preferred polymeric materials are capable of withstanding long periods of normal handling without degradation.

(8) Variable thermal conductivity—an embodiment permits the user to adjust the insulation effectiveness for optimal comfort.

The disclosed embodiments of this inventions are not to be construed as limitations thereof, but are merely examples of particular uses.

I claim:

1. A flexible insulating material comprising:
   a. one or more cover sheets; and
   b. at least one sheet of polymeric material formed into a three dimensional layer with a regular pattern of contiguous honeycomb like cells which are formed with angularly offset walls;
   c. said cells having an overall cell height to cell width ratio greater than 4;
   d. the cell walls are inclined to an angle greater than 10 degrees as measured from the normal to the plane of a cover sheet;
   e. the cellular layers being flexibly disposed between the cover sheets forming a sandwich type assembly.

2. An insulating material as described in claim 1 wherein the cellular material is formed into small segments for insertion into confined spaces between cover sheets.

3. A moisture permeable, flexible insulating material comprising:
   a. one or more moisture permeable cover sheets; and
   b. at least one sheet of a thermal radiation absorbing, flexible, polymeric film formed into a three dimensional layer with a regular pattern of contiguous honeycomb like cells which are formed with angularly offset walls;
   c. said cells having an overall cell height to cell width ratio greater than 4;
   d. the cell walls are inclined at an angle greater than 10 degrees as measured from the normal to the plane of a cover sheet;
   e. the cellular layers being flexibly disposed between the cover sheets forming a sandwich type assembly.

4. An insulating material as described in claim 3 wherein the cellular material is formed into small segments for insertion into confined spaces between the permeable cover sheets.

5. An insulation material as described in claim 3 wherein at least one side of the cover sheets is reflective.

6. An insulation material as described in claim 3 wherein at least one side of the cellular material is reflective.

7. An insulation material as described in claim 3 wherein at least one side of the cover sheets and the cellular material are reflective.

8. An insulation as described in claim 3 wherein at least one side of the cellular material is reflective and is formed into small segments for insertion into confined spaces between cover sheets.

9. An insulating material with user adjustable thermal conductance comprising:
   a. two cover sheets; and
   b. at least one sheet of polymeric material formed into a three dimensional layer with a regular pattern of contiguous honeycomb like cells which are formed with angularly offset walls;
   c. the cell walls are inclined at an angle greater than 60 degrees as measured normal to the plane of a cover sheet; and
   d. said cell layer being flexibly disposed between said cover sheets and edge stabilized, forming a sandwich type assembly;
   e. the assembly can be adjustably stretched in a direction perpendicular to the major cell dimension increasing the effective cell height and thereby the overall thickness and insulating effectiveness of the cell layers;
   f. said cells having an overall cell height to cell width ratio greater than 4 when in the fully stretched position; and
   g. when the adjusting stretching force is released, said assembly will contract and assume the original position.

10. An insulation material as described in claim 9 where the polymeric cellular material is thermal radiation absorbing.

11. An insulation material as described in claim 9 wherein at least one side of the cellular material is thermally reflective.

* * * * *